(12) United States Patent
Fischer

(10) Patent No.: US 8,353,282 B1
(45) Date of Patent: Jan. 15, 2013

(54) DISPOSABLE STOVE TOP COVER

(76) Inventor: Rodney B. Fischer, Willow Grove, PA (US)

( * ) Notice: Subject to any disclaimer, the term of this patent is extended or adjusted under 35 U.S.C. 154(b) by 1132 days.

(21) Appl. No.: 12/207,369

(22) Filed: Sep. 9, 2008

(51) Int. Cl.
*F24C 15/14* (2006.01)
*F24C 15/06* (2006.01)
*A47J 36/16* (2006.01)
*B32B 15/04* (2006.01)

(52) U.S. Cl. ............ 126/221; 126/211; 126/219; 99/446
(58) Field of Classification Search ................. 126/221, 126/211, 219; 99/446
See application file for complete search history.

(56) References Cited

U.S. PATENT DOCUMENTS

| 727,251 | A |   | 5/1903 | Allen |
|---|---|---|---|---|
| 916,657 | A |   | 3/1909 | Bihler |
| 1,370,113 | A |   | 3/1921 | Janusonis |
| 1,942,287 | A | * | 1/1934 | Heitz ............................ 206/447 |
| 2,002,894 | A |   | 5/1935 | Kahn |
| 2,340,173 | A |   | 1/1944 | Cash |
| 2,580,103 | A |   | 12/1951 | Keller |
| 2,696,812 | A |   | 12/1954 | Merritt |
| 2,826,778 | A | * | 3/1958 | Highlen .......................... 15/215 |
| 3,207,138 | A |   | 9/1965 | Marinace |
| 3,368,732 | A |   | 2/1968 | Kimble |
| 3,490,123 | A | * | 1/1970 | Clark ............................ 428/572 |
| 4,045,606 | A |   | 8/1977 | Kalkowski |
| 4,300,524 | A |   | 11/1981 | Elsasser |
| 4,483,314 | A |   | 11/1984 | Parker et al. |
| 4,625,708 | A | * | 12/1986 | Beall ............................ 126/42 |
| 4,763,639 | A |   | 8/1988 | Goldsworthy |
| 4,901,706 | A | * | 2/1990 | Schwanke, Jr. ............... 126/500 |
| 4,969,449 | A |   | 11/1990 | Levin |
| 5,084,321 | A |   | 1/1992 | Sui |
| 5,353,781 | A |   | 10/1994 | Calvillo |
| 5,490,567 | A |   | 2/1996 | Speer |
| 5,560,288 | A | * | 10/1996 | Licari ............................ 99/484 |
| 5,586,491 | A |   | 12/1996 | Diller |
| 6,044,834 | A | * | 4/2000 | Zappetti ...................... 126/39 M |
| 6,263,869 | B1 |   | 7/2001 | Abernethy |

(Continued)

FOREIGN PATENT DOCUMENTS

CA 2.067.702 10/1993

(Continued)

OTHER PUBLICATIONS

"JP06-159693 Machine Translation.pdf"; http://dossier1.ipd.ipdl.inpit.go.jp; English Machine Translation; Oct. 19, 2011.*

*Primary Examiner* — Steven B McAllister
*Assistant Examiner* — Daniel E Namay
(74) *Attorney, Agent, or Firm* — Michael I. Kroll

(57) ABSTRACT

The present invention discloses a disposable stove top covering that is used to protect the surface of the stove top during cooking. The stove top covering is comprised of a substantially planar sheet of material that may have decorative indicia or graphic thereon, such indicia may include recipes, instructions and/or information, etc. The cover is designed to protect the stove top as well as absorb fluids, such as oil, sauce and water. A bottom fluid impervious layer protects the stove top while an absorbent layer retains any spills with the top layer having micro holes for fluids to pass through and retained thereby. Also provided is a lip passing around the periphery of the cover and each heating element to contain fluids and food particle on the disposable cover.

1 Claim, 9 Drawing Sheets

U.S. PATENT DOCUMENTS

| | | | |
|---|---|---|---|
| 6,399,924 | B1 | 6/2002 | Cai |
| 6,502,570 | B2 * | 1/2003 | Grady .................. 126/37 A |
| 2009/0064990 | A1 * | 3/2009 | Wilkins et al. ............. 126/37 A |

FOREIGN PATENT DOCUMENTS

| | | | | |
|---|---|---|---|---|
| DE | 2701331 | | | 7/1978 |
| DE | 3427453 | A1 | * | 2/1986 |
| DE | 29805155 | | | 10/1998 |
| DE | 20304363 | | | 6/2003 |
| FR | 2.487.953 | | | 2/1982 |
| FR | 2.594.055 | | | 8/1987 |
| FR | 2.626.965 | | | 8/1989 |
| FR | 2626965 | A1 | * | 8/1989 |
| FR | 2.646.701 | | | 11/1990 |
| FR | 2646701 | A1 | * | 11/1990 |
| FR | 2.656.070 | | | 6/1991 |
| FR | 2656070 | A1 | * | 6/1991 |
| FR | 2678849 | A1 | * | 1/1993 |
| FR | 2.722.063 | | | 1/1996 |
| GB | 2295308 | A | * | 5/1996 |
| JP | 05180449 | A | * | 7/1993 |
| JP | 05264046 | A | * | 10/1993 |
| JP | 06159693 | A | * | 6/1994 |
| JP | 07071773 | A | * | 3/1995 |
| JP | 07293903 | A | * | 11/1995 |
| JP | 08061679 | A | * | 3/1996 |
| JP | 09243097 | A | * | 9/1997 |
| JP | 09264542 | A | * | 10/1997 |
| JP | 09280575 | | | 10/1997 |
| JP | 09303797 | A | * | 11/1997 |
| JP | 10030825 | A | * | 2/1998 |
| JP | 10054569 | A | * | 2/1998 |
| JP | 10160173 | | | 6/1998 |
| JP | 10295550 | A | * | 11/1998 |
| JP | 2006313045 | A | * | 11/2006 |

* cited by examiner

DISPOSABLE STOVE TOP COVER

BACKGROUND OF THE INVENTION

1. Field of the Invention

The present invention relates generally to coverings and, more specifically, to a selectively disposable stove top cover that may have decorative indicia or graphic thereon, such indicia may include recipes, instructions, information, etc. The cover is designed to protect the stove top as well as absorb fluids, such as oil, sauce and water. A bottom fluid impervious layer protects the stove top while the absorbent layer retains any spills with the top layer having micro holes for the fluids to pass through.

In all cases, the stove top covering can have a pattern or graphic image imprinted thereon.

2. Description of the Prior Art

There are other cooking covers designed for stoves and ovens. While these coverings may be suitable for the purposes for which they were designed, they would not be as suitable for the purposes of the present invention, as hereinafter described.

The present invention provides a stove top cover having information related to the operation of the stove, instructions related to the preparation of food and personal care instructions in the case of accidents, such as burns, eye care and stove fires. Furthermore, the stove top is designed to absorb spills to prevent contamination of the cooking utensils, such as when moved to countertops and provides for the placement of cooking utensils thereon, such as when a recipe calls for moving the pan off the heating element.

SUMMARY OF THE PRESENT INVENTION

A primary object of the present invention is to provide a stove top with a covering element that is used during the preparation of food items.

Another object of the present invention is to provide a stove top covering manufactured from a fire retardant material incorporating different bonded layers having a pattern or graphic image imprinted thereon.

Yet another object of the present invention is to provide a bottom liquid impervious layer to prevent passage of fluids and oils to the stove top having an absorbent layer to retain spills and a top porous layer to allow fluids to pass into the absorbent layer.

Still yet another object of the present invention is to provide a top layer that can enhance the appearance of a kitchen by having a design or decorative motif to complement the kitchen including floral patterns, sports teams or pictures of activities and educational purposes such as first aid information, typical cooking times and favorite recipes.

An additional object of the present invention is to provide a stove top covering having a plurality of aperture which encompass the stove top burners.

A further object of the present invention is to optionally provide a stove top cover having a peripheral lip around the edge to contain fluids within said cover.

A yet further object of the present invention is to provide a stove top covering having apertures for the burners and wherein said stove top covering covers the surface of the stove top around the heating elements.

A still yet further object of the present invention is to provide a stove top covering that provides drain apertures and absorbent inner layer.

Another object of the present invention is to provide a stove top covering that is disposable.

Yet another object of the present invention is to provide a stove top covering having a pattern or graphic image on said top side.

Additional objects of the present invention will appear as the description proceeds.

The present invention overcomes the shortcomings of the prior art by providing a selectively disposable stove top cover that may have decorative indicia or graphic thereon, such indicia may include recipes, instructions, information, etc. The cover is designed to protect the stove top as well as absorb fluids, such as oil, sauce and water. A bottom fluid impervious layer protects the stove top while the absorbent layer retains any spills with the top layer having micro holes for the fluids to pass through.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
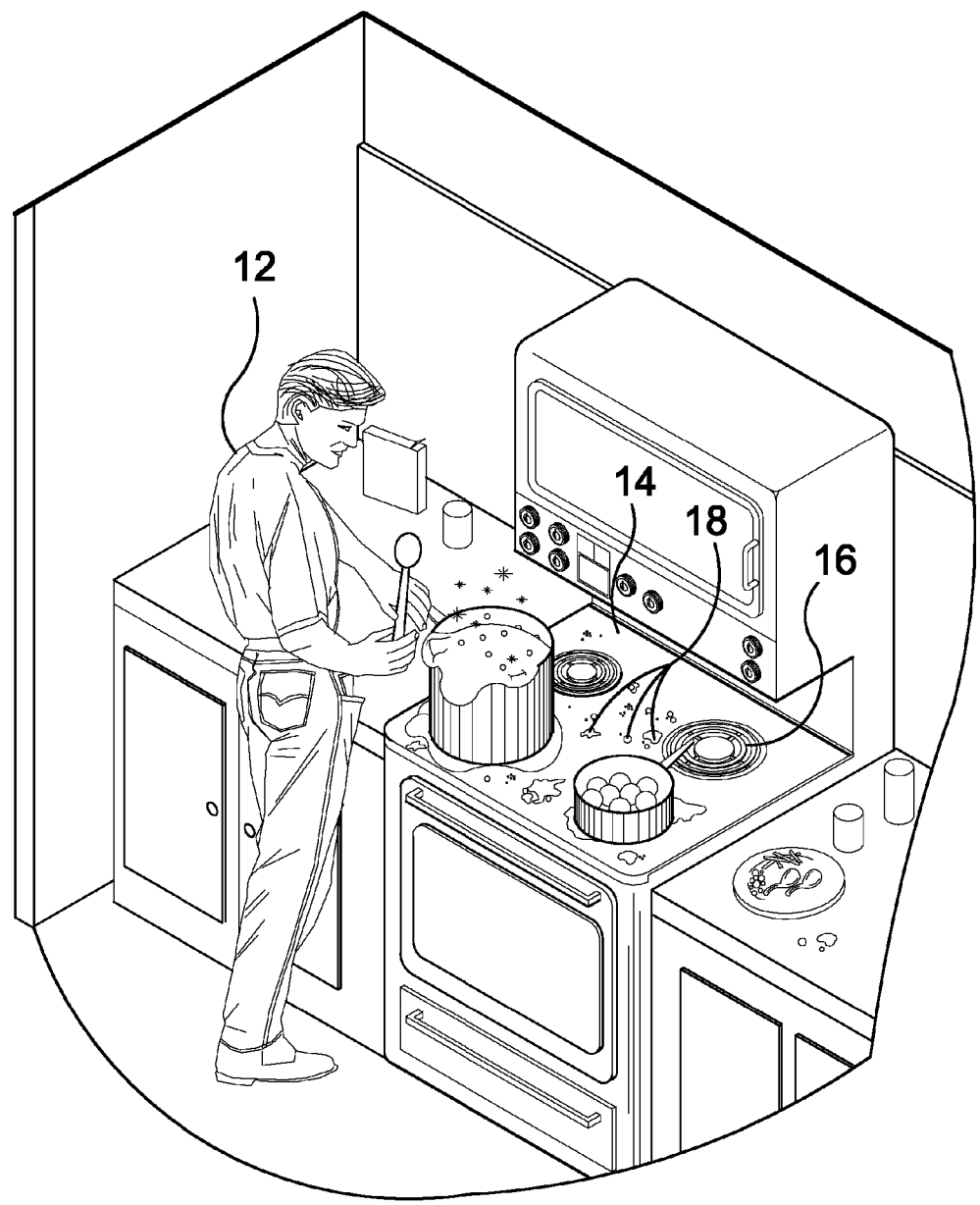
FIG. 1 is an illustrative view of the prior art.

Turning now descriptively to the drawings, in which similar reference characters denote similar elements throughout the several views, the figures illustrate the Water and Wind Turbine of the present invention. With regard to the reference numerals used, the following numbering is used throughout the various drawing figures.

10 stove top cover of the present invention
12 user
14 stove top
16 heating element of 14
18 splatter
20 covering 22 apertured layer
24 absorbent layer
26 fluid impervious layer
28 aperture
30 heating element aperture
32 wall of 30
34 channel of 20
36 channel ridge
38 channel trough
40 indicia/design
42 lip of 30
44 lip of 20

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of the prior art. When a user 12 is cooking on a typical stove top 14, either gas or electric it is not uncommon for spilling and splattering 18 to take place especially when frying, the stove top and heating elements 16 becomes messy and greasy, requiring a substantial amount of clean up. The present invention overcomes these problems by providing a disposable, protective covering for cooking surfaces of stoves or cooking ranges and comprises a triple layered fire retardant flexible cover having a top decorative layer with drain apertures in communication with an absorbent, center layer and a fluid impervious bottom layer designed to fit over a conventional stove to protect the cooking surface from splattering food and grease.

Figure 2:
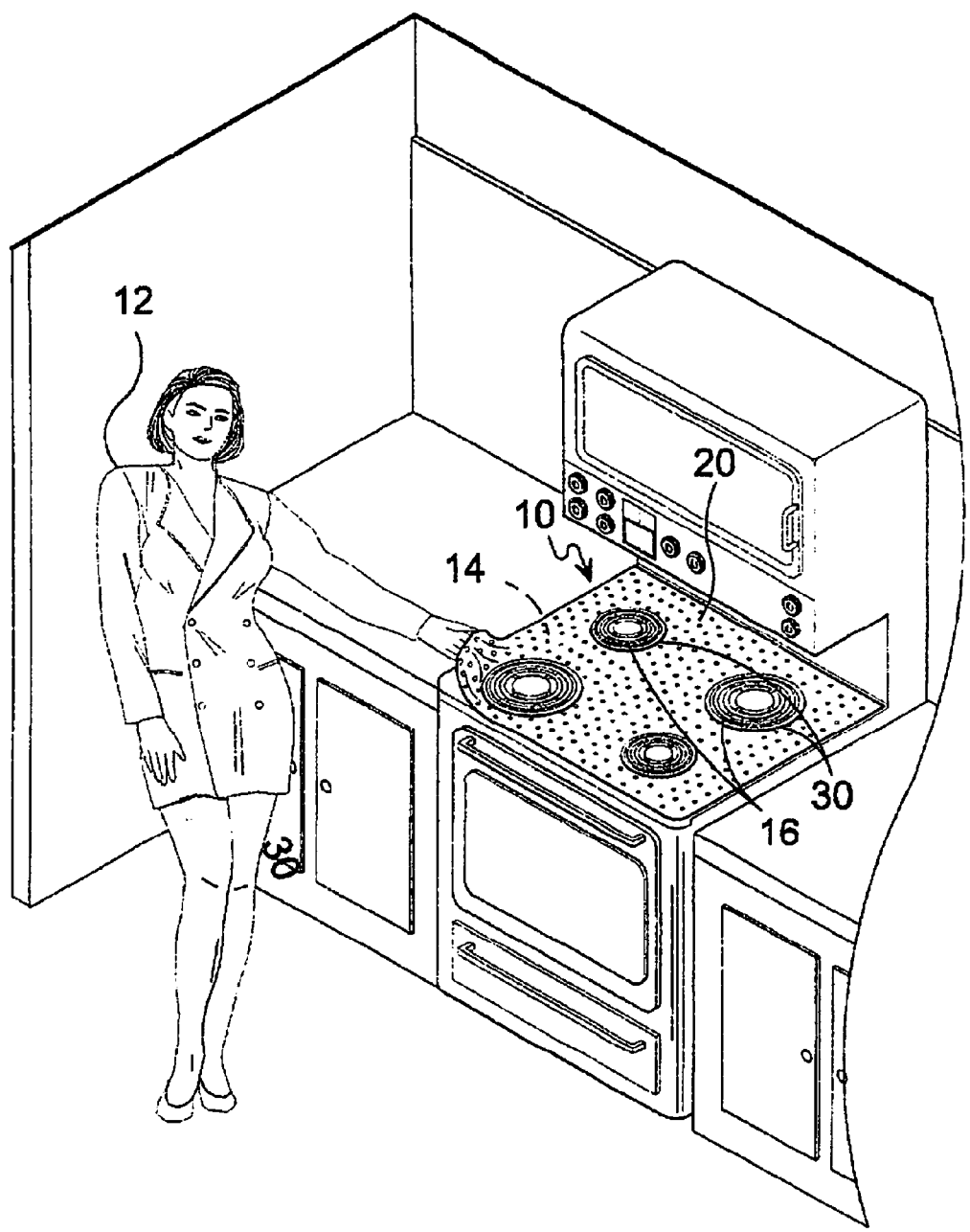
FIG. 2 is an illustrative view of the present invention in use.

Referring to FIG. 2, shown is an illustrative view of the present invention in use. The present invention provides user 12 with a selectively disposable stove top 14 cover 10 that may have decorative indicia or graphic thereon, such indicia may include recipes, instructions, information, etc. The cover 20 has heating element 16 apertures 30 whereby the cover 20 protects the stove top 14 by absorbing fluids, such as oil, sauce and water. A bottom fluid impervious layer protects the stove top while the absorbent layer retains any spills with the top layer having micro holes for the fluids to pass through.

Figure 3:
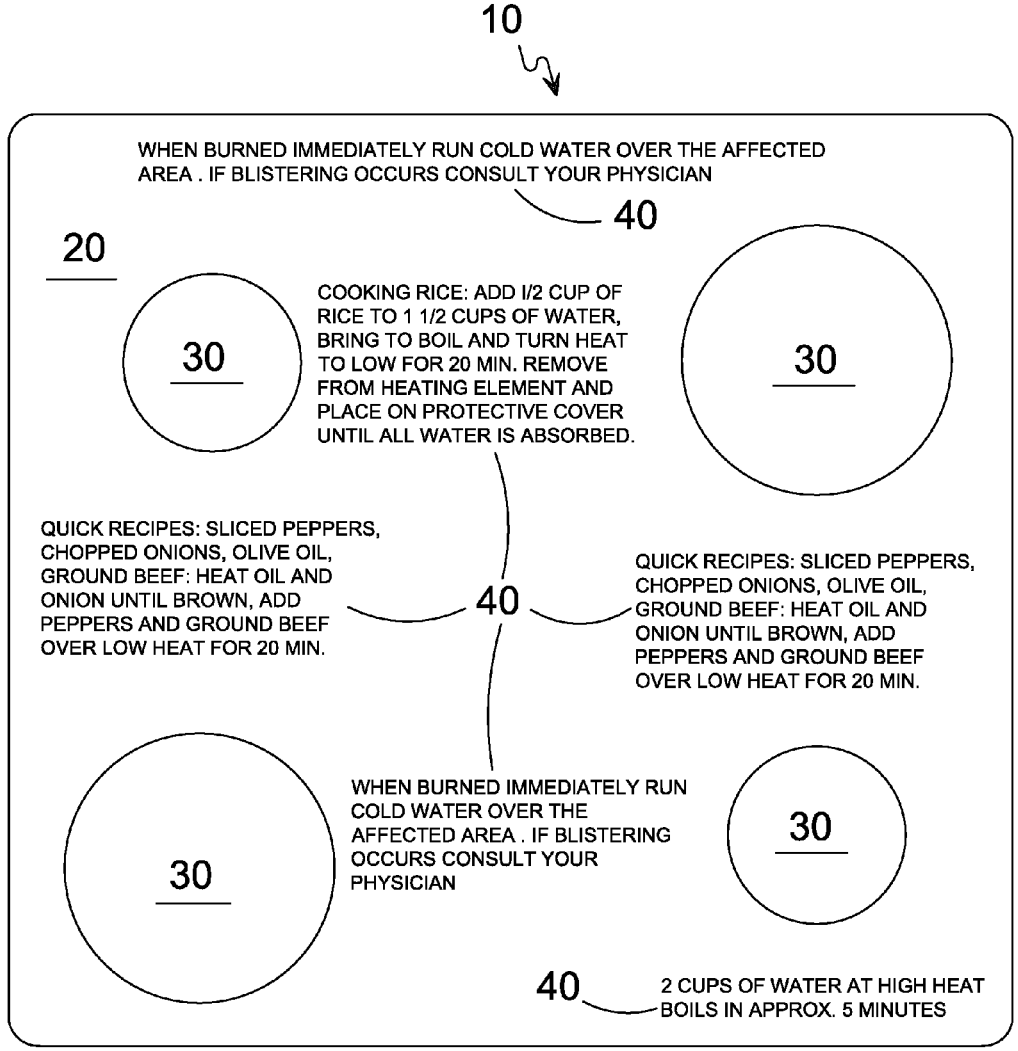
FIG. 3 is a perspective view of the present invention.

Referring to FIG. 3, shown is a perspective view of the present invention. The present invention 10 provides means whereby a stove top cover 20 having heating element aperture 30 can serve instructional means 40 as well as utilitarian means, as for example, what to do in case of accidents, favorite recipes which can be combined with a motif, such as displaying chickens, cows, ducks, fish, etc., and with recipes related to a graphic display. Furthermore, advertisers for goods or services can use the disposable stove tops to inform consumers of new products.

Figure 4:
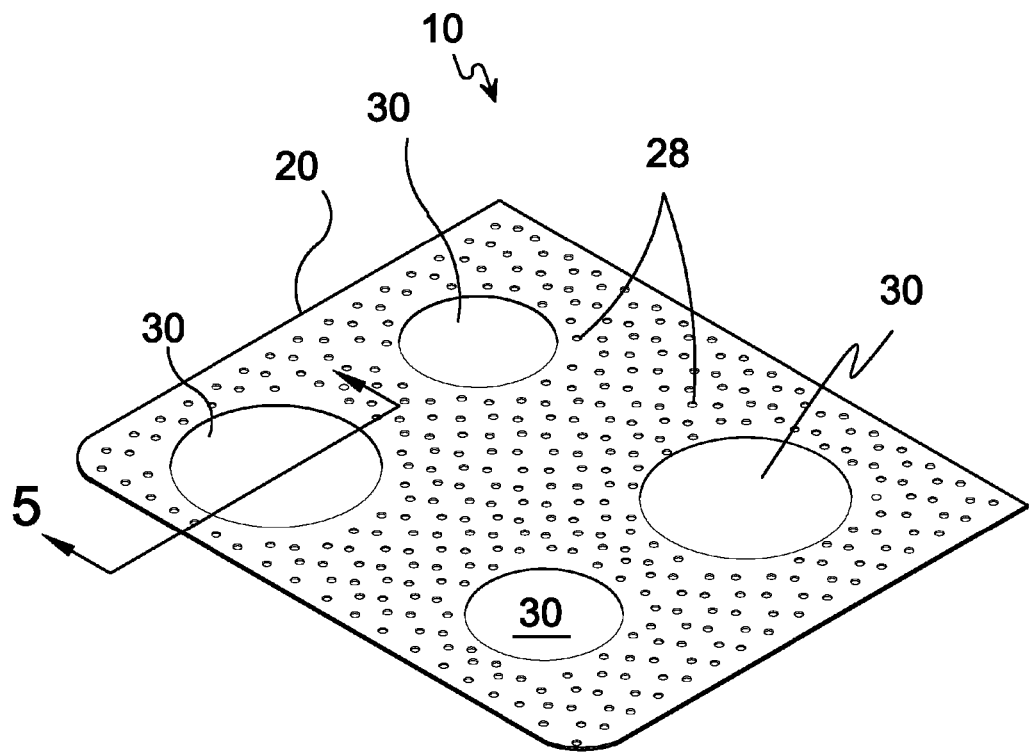
FIG. 4 is a perspective view of the first embodiment of the present invention.

Referring to FIG. 4, shown is a perspective view of the stove top cover of the present invention. Shown is the present invention 10 comprising a disposable protective covering 20 having heating element aperture 30 for cooking surfaces 14 of stoves or cooking ranges incorporating different bonded layer. The top layer is provided with micro apertures 28 providing for fluids to pass therethrough while the top can further enhance the appearance of a kitchen by having a design or decorative motif to complement the kitchen including floral patterns, sports teams or pictures of activities and educational purposes such as first aid information, typical cooking times and favorite recipes.

Figure 5:
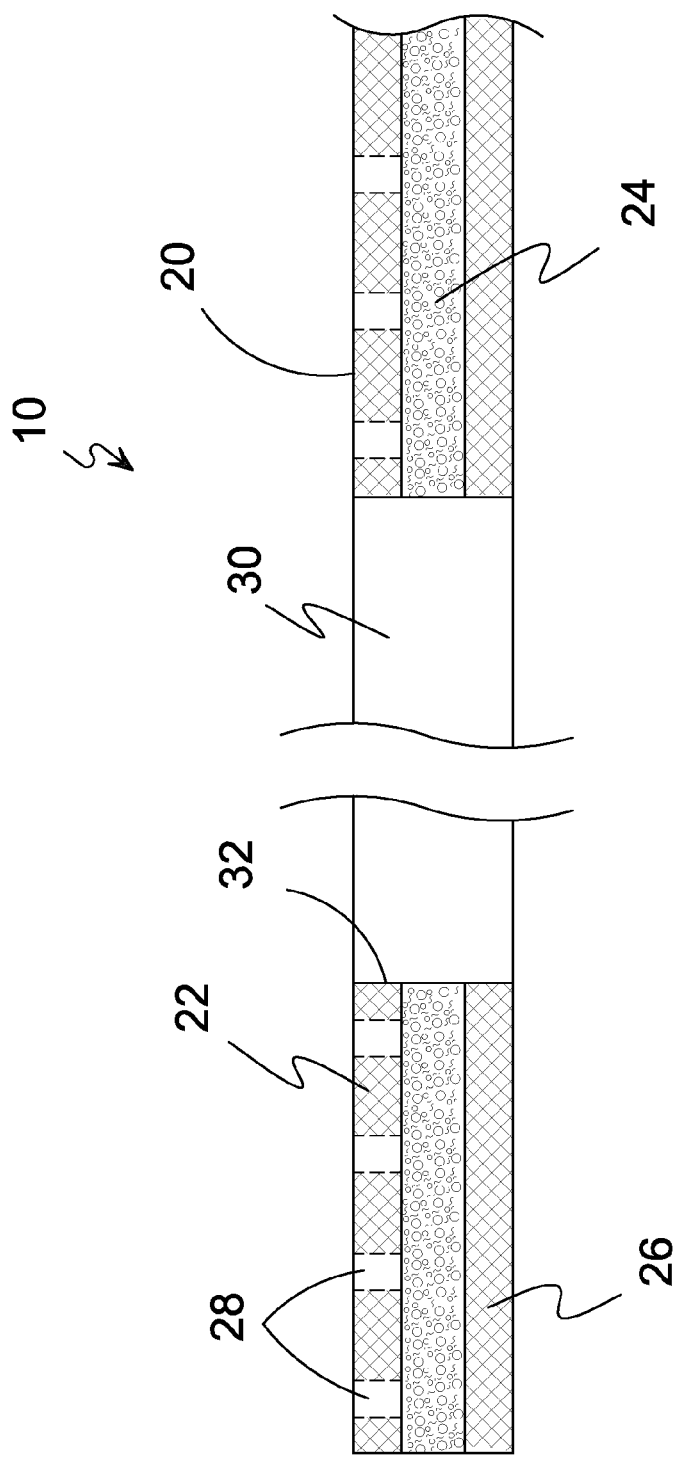
FIG. 5 is a sectional view of the decorative pliable stove top cover of the present invention.

Referring to FIG. 5, shown is a cross sectional view taken from FIG. 4 as indicated. Shown is a cross sectional view of the stove top cover of the present invention 10, a disposable, protective covering 20 having heating element apertures 30 and wall 32 for encompassing the stove heating elements located on the cooking surfaces of stoves or cooking ranges, with the cover comprising a triple layer fire retardant, flexible, porous outer cover 22, having drain apertures 28 to an inner absorbent layer 24 and a bottom fluid impervious layer 26 designed to fit over a conventional stove to protect the cooking surface from splattering food and grease. The top portion of the device can be provided with many various designs such as kitchen related, sports related, floral or other designs.

Figure 6:
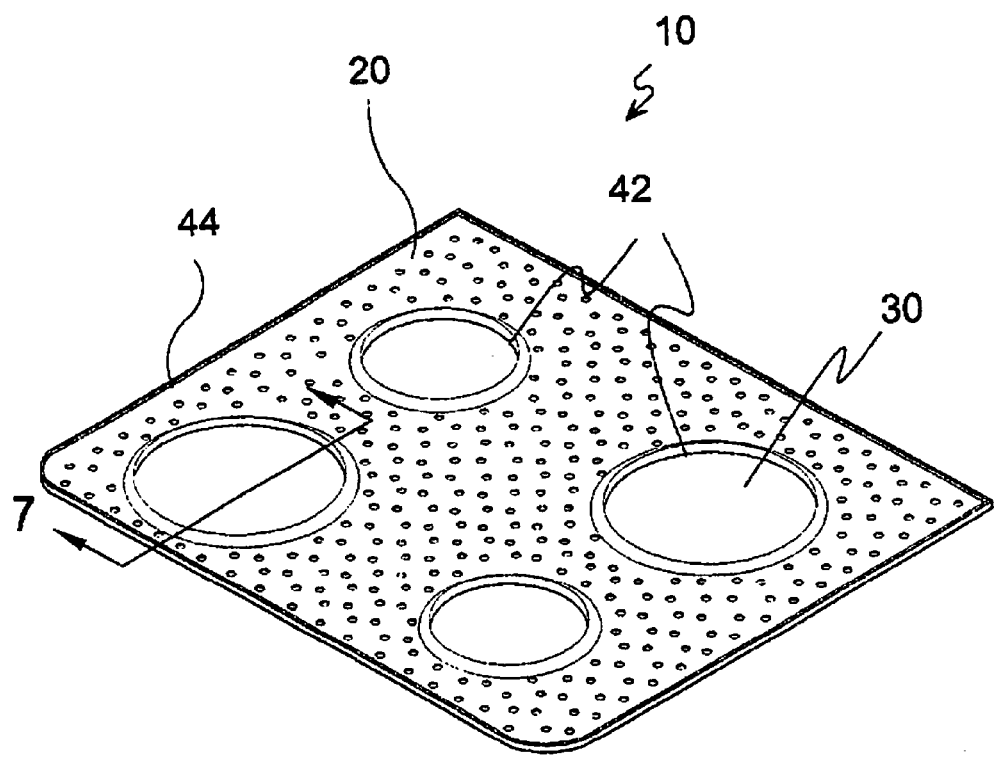
FIG. 6 is a perspective view of the second embodiment of the present invention.

Referring to FIG. 6, shown is a perspective view of an additional element of the present invention. A disposable, protective covering for cooking surfaces of stoves or cooking ranges comprising a triple layer fire retardant, flexible, impervious covering 20 having heating element apertures 30 with slightly raised lips 42 for easy drainage, with drain apertures leading to an inner absorbent layer and a bottom fluid impervious layer. An outer lip 44 along the periphery of cover 20 prevents leakage of fluids past cover 20. The device is designed to fit over a conventional stove to protect the cooking surface from splattering food and grease. The top portion of the device can be provided with many various designs such as kitchen related, sports related, floral or other designs.

Figure 7:
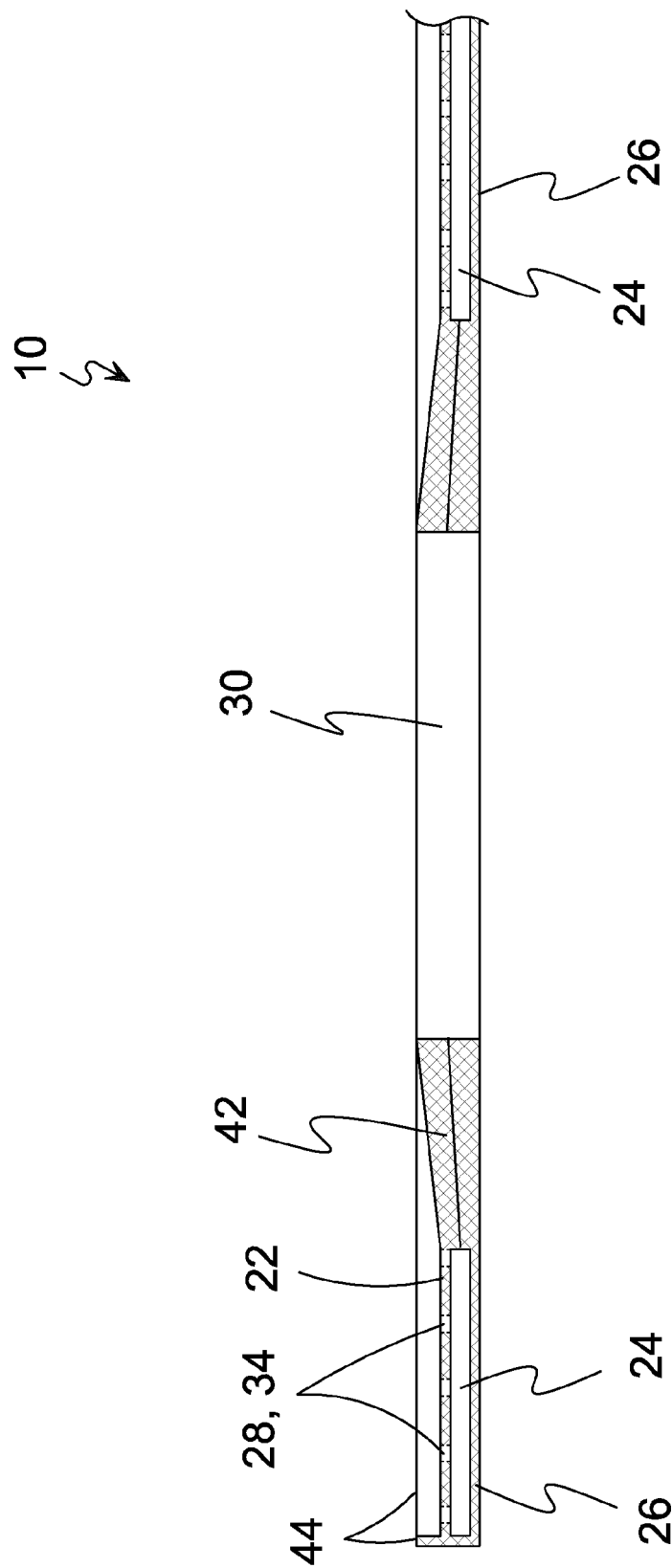
FIG. 7 is a sectional view of an additional element of the present invention.

Referring to FIG. 7, shown is a cross sectional view taken from FIG. 6 as indicated. Shown is the additional element of the present invention for the disposable, protective covering for cooking surfaces of stoves or cooking ranges, comprised of a lip 42 along the heating element apertures 30 and lip 44 along the periphery of the cover 20. Top layer 22 has micro apertures 34 for channeling fluids into absorbent layer 24. Fluid impervious layer 26 prevents any fluid from contaminating the stove top.

Figure 8:
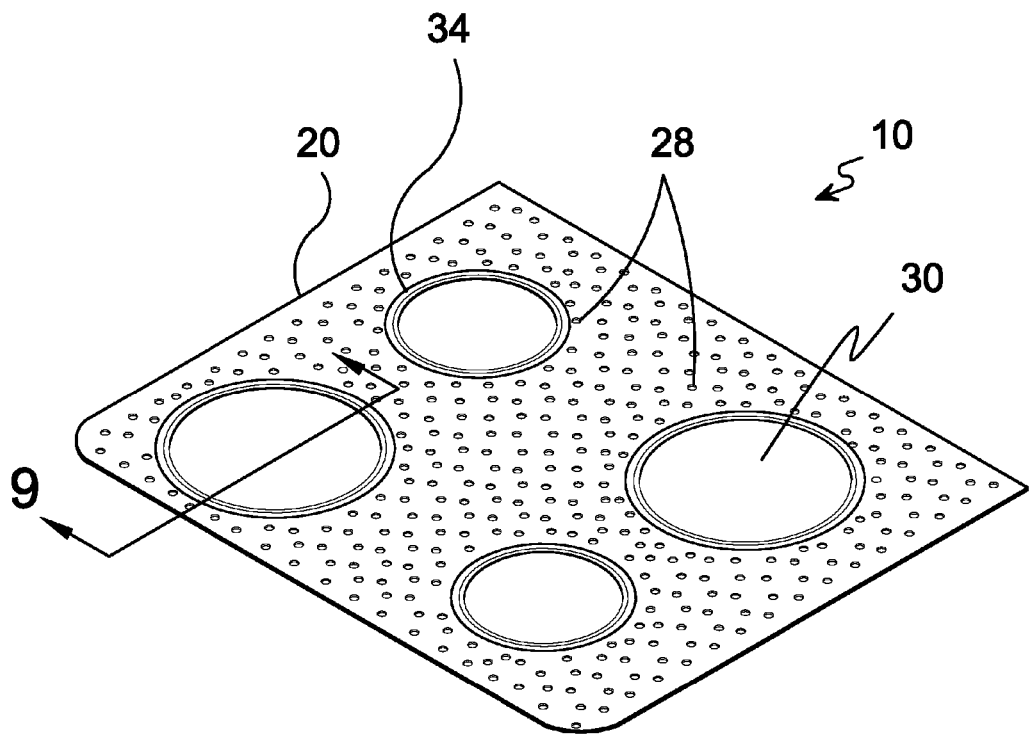
FIG. 8 is a perspective view of another additional element of the present invention.

Referring to FIG. 8 shown is a perspective view of another additional element of the present invention. Shown is another additional element of the present invention for the disposable, protective covering for cooking surfaces of stoves or cooking ranges comprising channels 34 encompassing heating elements 30 that are in fluid communication with the absorbent layer of cover 20 along with micro aperture 28. As aforementioned the top of the stove top cover can have graphic images or indicia that is viewable while the stove top cover 20 is in use.

Figure 9:
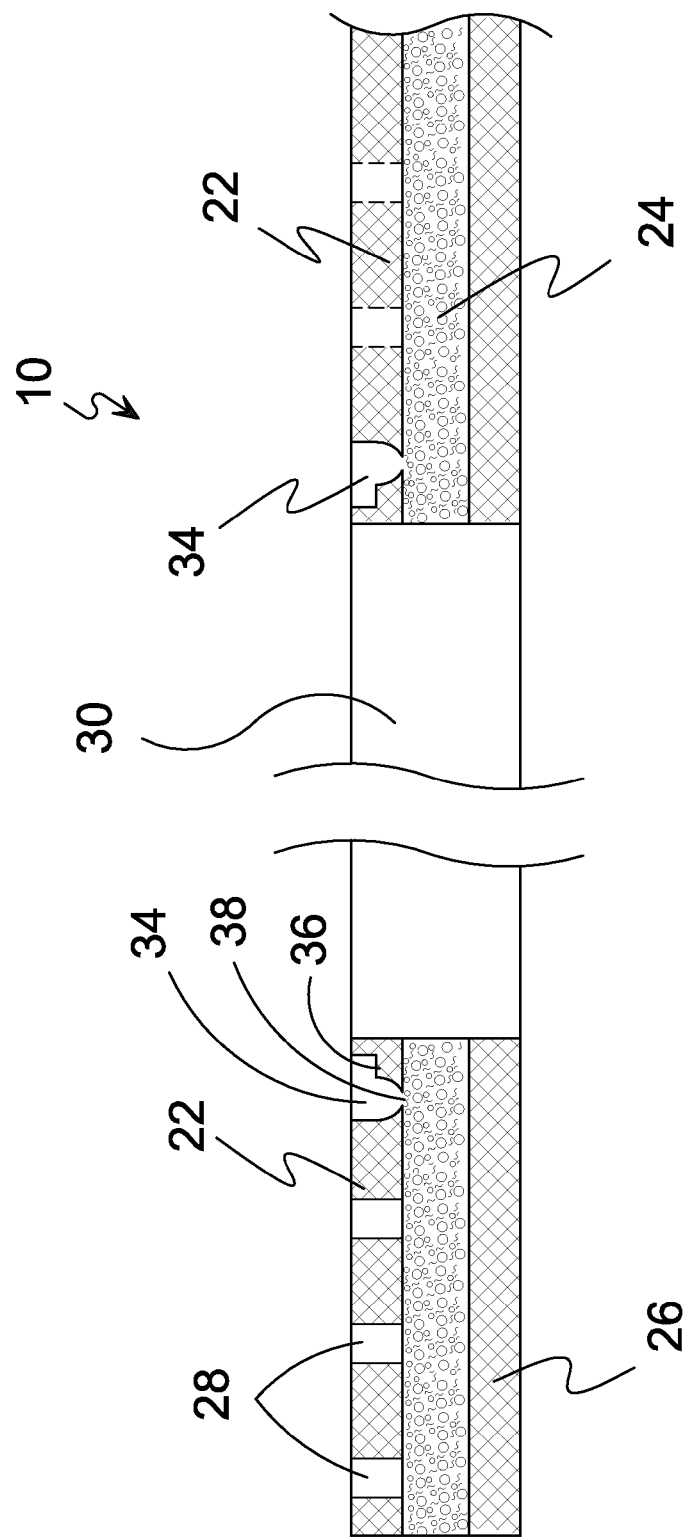
FIG. 9 is a sectional view of the decorative pliable stove top cover of the present invention.

Referring to FIG. 9, shown is a cross sectional view taken from FIG. 8 as indicated. Shown is the stove top cover of the present invention 10 having top layer 22 with apertures 28 and channels 34 comprising ridge 36 and trough 38 encompassing heating element aperture 30. Each being in fluid communication with absorbent layer 24 to contain any spills within the disposable stove top cover having fluid impervious layer 26 to prevent any spills from contaminating the stove top.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A disposable cover for the top of a stove having heating elements thereon, consisting of:
 a) a substantially planar sheet having an aperture for each of said heating elements, each aperture having a wall surrounding a heating element, and a top surface which is level across substantially the whole said top surface;
 b) the planar sheet comprising a porous top layer having a plurality of micro apertures allowing a fluid to pass there-through, a middle layer of an absorbent material and a bottom fluid impervious layer, said porous top layer allowing fluids to pass into said porous layer;
 c) a channel in said top layer surrounding each said aperture, each channel having a bottom opening leading to said absorbent middle layer, curved walls forming sides of said bottom opening with a ridge formed in the curved wall closest to said aperture, said channel extending down from said top surface;
 c) the top layer having a design that incorporates a graphic image and indicia that is visible during use of the stove top cover, said graphic image including instructions in case of an emergency, recipes, and advertising.

\* \* \* \* \*